(12) United States Patent
Fessler

(10) Patent No.: US 7,005,151 B1
(45) Date of Patent: Feb. 28, 2006

(54) METHOD AND APPARATUS FOR COATING A PRODUCT

(75) Inventor: Martin Fessler, Vojens (DK)

(73) Assignee: Gram Equipment A/S, Vojens (DK)

(*) Notice: Subject to any disclaimer, the term of this patent is extended or adjusted under 35 U.S.C. 154(b) by 338 days.

(21) Appl. No.: 10/110,019

(22) PCT Filed: Oct. 5, 2000

(86) PCT No.: PCT/DK00/00555

§ 371 (c)(1),
(2), (4) Date: Apr. 8, 2002

(87) PCT Pub. No.: WO01/26478

PCT Pub. Date: Apr. 19, 2001

(30) Foreign Application Priority Data

Oct. 8, 1999 (DK) ................................ 1999 01441

(51) Int. Cl.
A23G 9/24 (2006.01)

(52) U.S. Cl. .................. 426/100; 426/101; 426/231; 426/293; 426/306; 426/307; 118/29

(58) Field of Classification Search ................ 426/100, 426/101, 231, 281, 293, 297, 302, 306, 307; 118/26, 29
See application file for complete search history.

(56) References Cited

U.S. PATENT DOCUMENTS

| | | | | |
|---|---|---|---|---|
| 142,728 A | * | 9/1873 | Reagan | 427/435 |
| 418,801 A | * | 1/1890 | Lorimer | 68/190 |
| 1,494,498 A | * | 5/1924 | Morgan | 118/26 |
| 2,418,190 A | * | 4/1947 | Overland | 426/306 |
| 2,536,635 A | | 1/1951 | Friedman | |
| 2,695,590 A | | 11/1954 | Zuercher | |
| 2,771,049 A | * | 11/1956 | Fish | 228/33 |
| 4,204,498 A | * | 5/1980 | Ivancic | 118/693 |
| 4,301,762 A | * | 11/1981 | Burnett, Jr. | 118/16 |
| 4,779,562 A | * | 10/1988 | Ono | 118/402 |
| 5,258,146 A | * | 11/1993 | Almquist et al. | 264/401 |
| 5,343,710 A | * | 9/1994 | Cathenaut et al. | 62/71 |
| 5,639,304 A | * | 6/1997 | Hoffman | 118/407 |
| 5,798,131 A | | 8/1998 | Bertrand et al. | |
| 6,491,958 B1 | * | 12/2002 | Tucker et al. | 426/289 |

FOREIGN PATENT DOCUMENTS

| | | | |
|---|---|---|---|
| CH | 680183 A | * | 7/1992 |
| DE | 1095641 | | 6/1961 |
| DE | 1195589 | | 6/1965 |
| DE | 19741096 | | 3/1999 |
| DK | 144671 | | 5/1982 |

(Continued)

Primary Examiner—Drew Becker
(74) Attorney, Agent, or Firm—James Creighton Wray; Meera P. Narasimhan

(57) ABSTRACT

There is described an apparatus (1) that may be used for providing ice lollies (2) with a coating from a dipping container (4). The coating mix (3) comprises almond flakes (16) and fluid chocolate (10) which is inserted in a third area (38). Displacement bodies (25) are lifted and lowered into first areas (28) while the ice lolly (2) is lowered in a central second area (20). The lowering occurs when the displacement means are completely down whereby a well-defined surface level (23) is achieved by using level plates (21). The movement of the displacement means (25) creates sufficient stirring and flow in flow ducts (36, 43) in order to ensure homogenisation of the coating mix (3) situated in the central second area (20) where the ice lollies (2) are coated.

7 Claims, 4 Drawing Sheets

FOREIGN PATENT DOCUMENTS

| | | | |
|---|---|---|---|
| EP | 234996 A * | 9/1987 | |
| EP | 0500940 | 9/1992 | |
| WO | WO 93/04592 | 3/1993 | |
| WO | WO 00/19838 | 4/2000 | |

* cited by examiner

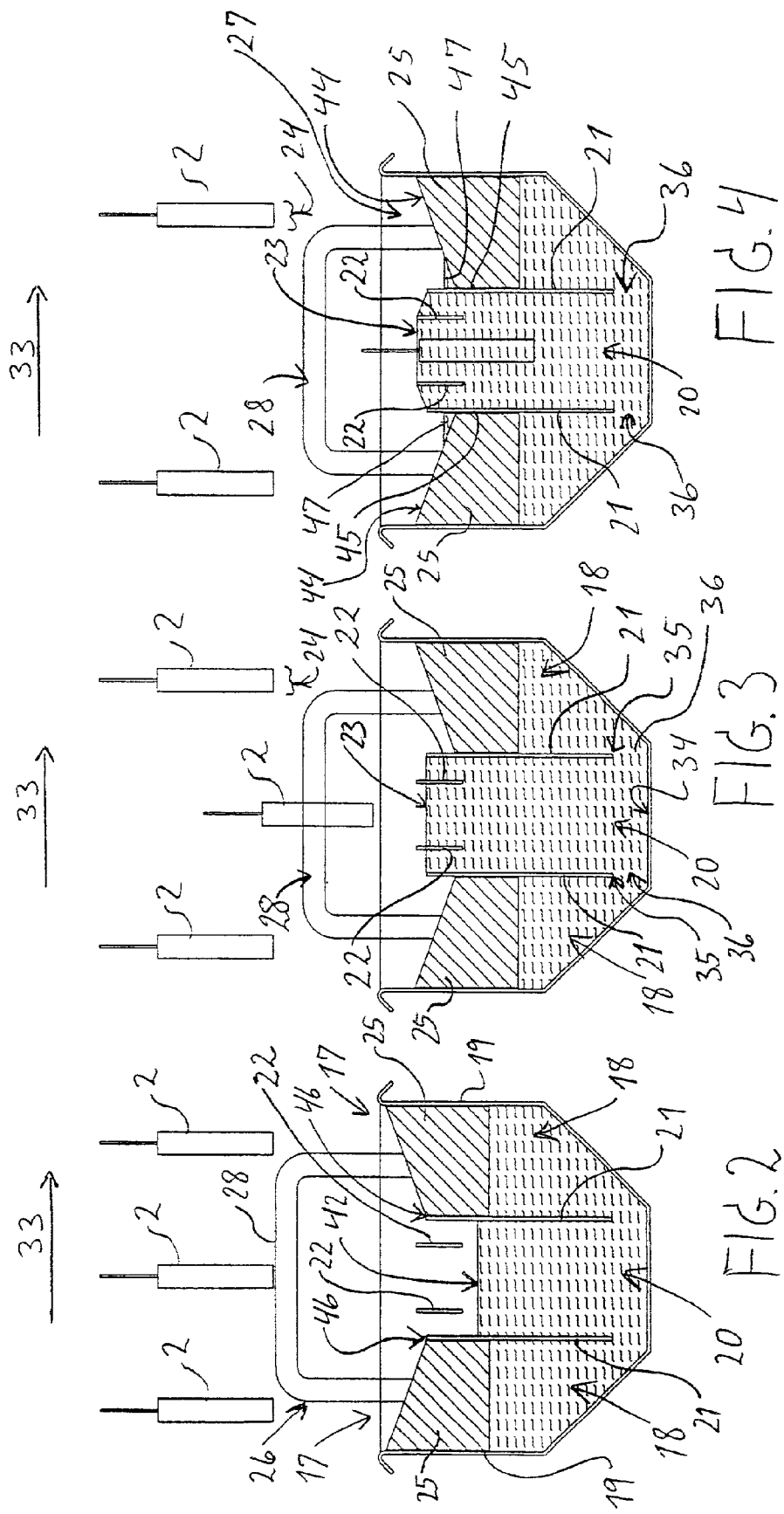

METHOD AND APPARATUS FOR COATING A PRODUCT

This application claims the benefit of Danish Application No. PA 1999 01441 filed Oct. 8, 1999 and International Application No. PCT/DK00/00555 filed Oct. 5, 2000.

BACKGROUND OF THE INVENTION

The present invention concerns a method for coating a product with a fluid coating containing solid fragile additives as the product is dipped in the coating mix which is stirred for preventing sedimentation of the additives.

Furthermore, the invention concerns an apparatus for use with such coating, the apparatus comprising a container, stirring means and supply means for the coating and the additives.

The invention particularly finds application by coating of confectionery products like ice lollies with fluid chocolate coating containing nut pieces, preferably elongate almond flakes. The products may also comprise inedible products, for example files provided with grinding/filing particles which are mixed into fluid glue acting as coating on a base element in the file. Also, in corresponding way the invention will find application within other areas where coating is established by dipping a product in a coating mix in which stirring is performed for avoiding sedimentation of different fluid elements in the coating. Thus the present invention may also be used with advantage in connection with a coating consisting of different fluid basic components which have a tendency toward sedimentation if stirring is not performed, and where the individual basic components may be decomposed by pumping. Even though additives are used to designate particle-shaped objects in the present application, the expression may also cover a fluid additive, which is fragile, as there is a risk of decomposition by strong mechanical influence through pumping and/or stirring.

Previously, when establishing chocolate coating containing fragile additives, containers in which the ice lollies were dipped by rows have been used as they are freely suspended at the underside of a traditional slat belt conveyor. In the conveyor, displacement pumps of different types have been used for creating stirring in the form of circulation in the fluid chocolate mass containing the almond flakes. This has often been combined with a rotating mechanical agitator placed at the bottom of the container in order to create sufficient movement in the coating mix.

However, the prior art methods for creating movement in the coating mix have implied a problem as the displacement pumps and the stirring means have had a destroying effect on the fragile additives, as for example almond flakes, nut pieces or similar. It is perceived as a quality in the finished product that such additives maintains the originally intended size, and thus it has been unfavourable when such additives were crushed in connection with the stirring.

Furthermore, the prior art vessels have been disadvantageous as there has been a need for mixing chocolate mass and additives in advance. This has caused the additives to have long keeping time in the chocolate mass. This has caused a quality problem as almond flakes, when mixed into the warm chocolate mass typically having a temperature of 25–40° C., will be warmed up. Hereby oil is liberated which decomposes the chocolate mass.

In order to achieve sufficient homogeneity and uniformity in the coating mix, it has been necessary to work with relatively large amounts of coating mix for covering the consumption occurring by dipping the products. This has been unfavourable by shutting down the process as a relatively large amount of coating mix has to be discarded. Furthermore, a large amount of coating mix will result in some nut pieces staying a long time in the mixture, thereby increasing the risk of liberating oil.

By prior art coating containers used in coating ice lollies, one has furthermore had a problem if an ice has been released from a conveyor and is fallen down into the coating mix. Such an ice will cause problems since the lolly is moved around in the mass. The lolly may be crushed in the mechanical stirring means and/or crushed in the displacement pumps used for creating circulation in the coating mix. For many years there have been experiments with establishing filters and the like for catching wood splinters. This has, however, been difficult in coating mixtures containing additives as such additives have to be transported freely through the system.

SUMMARY OF THE INVENTION

It is the purpose of the present invention to indicate a method and an apparatus making possible to relieve the drawbacks by the known systems by enabling a careful handling which is not decomposing the additives and which simultaneously can be made very compact in order to reduce the amount of mixed coating mass and additives in the dipping container.

This is achieved according to the present invention by a method of the kind mentioned in the introduction which is peculiar in that the stirring is established as displacing bodies are lifted and lowered in one or more first areas of the coating mix, and that the products are lowered into a second area of the coating mix as the level of the surface of the coating is kept stationary during the lowering.

The apparatus according to the present invention is peculiar in that the container comprises:
- at least a first area where displacement means are provided and arranged for moving down into and up from the mix,
- a second area in which there may be established a well-defined level for the surface by means of height adjustable level plates delimiting the second area and in which the products are dipped, and
- at least a third area in which supply means discharge, and that flow connections are established between the areas of the container.

A system according to the present invention is thus a pump-free system enabling a very careful handling of the coating mixture. Hereby the risk of damaging the structure of the additives is eliminated. Surprisingly, it has appeared possible to establish sufficient stirring in order to avoid sedimentation/settlement by lifting and lowering the displacement bodies in the coating mix in the dipping container. By lowering the bodies, coating mix is displaced from the first areas of the container. The displaced amount is moved over into the first and third area in the container. By lifting displacement bodies, the coating mix will again run back to the first areas. This alternating flow together with the disturbance established in the container has appeared to be sufficient to avoid sedimentation and sufficient for maintaining a homogenous mixture even when using relative small amounts of coating mixture in the dipping container. By moving the displacement bodies, the flow will be established through the flow connections between the different areas of the container.

By the careful stirring provided by lifting and lowering of the displacement bodies, there is not only achieved the advantage of maintaining the additives without crushing. At the same time, the problem with possible ice lollies in the coating mix is solved. Such ice lollies will also be treated carefully, and the risk of wood splinters, that can be transferred to the ice lolly product, is also eliminated.

It has appeared possible to provide supply means supplying fluid coating and supply means supplying additives directly into the container. When it is ensured that these discharge in an area not being in direct contact with the second area in which the products are dipped, it will be possible to establish sufficient mixing for creating a homogenous coating mix. This is made possible by the supply means discharging in a third area. Before the coating mix reaches the second area, where it is used for coating the products, the mixture will appear homogenous due to the movement of the displacement bodies.

As a very small amount of coating mix may be used, the staying time of the nut pieces in chocolate will be very short, and therefore the risk of oil liberation is reduced. Thus no depreciation of the quality of the fluid coating, typically a chocolate mass, will occur. The fragile additives will simultaneously appear without being decomposed. Thus there is provided a coating mix of high quality.

The apparatus is very simple to design as the need for displacement pumps, stirring means and shaft lead-ins between motors outside the container and mechanical stirring means in the container is avoided. The movement of the displacement means may be established very simply by connecting these with drive means extending through the open top of the container. In very large containers, supplementing agitators may possibly be used, passing through the open top side of the container from above and, for example, extending to the third or second area.

An advantageous embodiment of the method is peculiar in that the products are lowered at a time where the displacement bodies are completely lowered, and where the level of the coating mix surface is kept stationary at an upper level. In this way it is ensured that the products are imparted coating to a uniform height. This level is achieved in a particularly precise and simple way by using height adjustable level plates in the apparatus. The level plates may be adjusted in the desired height. By lowering the displacement bodies, the coating mix in the second area of the container will run over the edge of the level plates.

Alternatively, it will be possible to operate with two sets of level plates so that there is a first set of level plates delimiting the second area, and that within this area there is provided a further set of level plates for fine adjustment of the level of the coating. This occurs as these plates are provided with small mutual distance largely corresponding to the width of the product which is dipped into the coating mix.

Usually, the adjustable level plates will be placed stationarily in the second area when the apparatus is used for a certain type of products. When the apparatus is used for a second product, the level plates may be adjusted for fitting to such a new product.

Even though the level in the container is adjusted by using the level plates, it will be possible to replenish the container. For this purpose, the method according to the invention is peculiar in that the consumption of the coating mix is determined, and that replenishment of coating and additives is performed in an adjusted proportion in consequence of this determination as the additives and fluid coating are inserted in a third area of the coating mix. For registering the consumption there is provided means which registers the level in the container. These may be optical means or acoustic means with a transmitter/receiver function. They may also be based on pressure sensors where a pressure is transformed to a surface level in the container. In such pressure sensors, there may be attained a precision in consumption within 1–2 decilitres coating mix by measurements in microbar.

As mentioned previously, it is essential that the supply means discharge in the third area in order to achieve sufficient mixing. Mixing of the additives in the fluid coating occurs in the third area before coating mixing penetrates into the first area via the flow connections.

It is preferred that coating is inserted by pumping at an arbitrary level in the container while the additives are sprinkled down on the surface of the coating mix located in the third area. Hereby is achieved a very simple transport by means of a vibration supply or by means of a conveyor belt for supplying the additives.

The supply means will preferably be controlled by a control unit receiving a signal from registration means which measures the level of the coating mix in the container. Thus it will be possible currently to supply the amount of fluid coating and the amount of additives necessary for keeping the amount of coating mix within predetermined limits. These limits ensure that the coating mix will always reach the top side of the level plates when the displacement bodies are completely lowered into the coating mix.

According to an advantageous embodiment, the apparatus is peculiar in that the container is elongate, that an elongate first area is disposed at each side of a central second area, that height adjustable level plates are disposed in the border area between the second area and the first areas, that the third area is disposed in continuation of the second area, that the displacement means are elongate and largely fills out the area of an associated first area, that the third area and the second area are separated by a dividing plate extending from a level above the uppermost possible surface level of the coating mix to a level below the lowermost possible surface level of the coating mix, and that the flow connections are formed between the dividing and level plates and the bottom of the container.

With such a design of the apparatus, the displacement bodies will force the coating mix under the level plates and the dividing plate by lowering into the coating mix. Hereby is avoided the risk of additives being conveyed into the second area, lying on the surface of the coating mix. When the container is designed in this way, it will be suitable for placing under a conveyor where several products, for example ice Lollies, are suspended at the underside of a slat conveyor. Thus a large number of juxtaposed ice jollies may simultaneously be dipped in the elongate central area. As the third area is disposed along one side of the elongate area, a particularly simple locating of the supply means outside the product conveyor situated above the container is achieved.

If the upper side of the displacement means is inclined toward the central second area and have a lower side edge situated over the level plates when the displacement means are in their upper position, possible coating mix, which during the lowering of the means runs over the upper side of the level plates and is disposed at the upper side of the displacement bodies, may run back into the central second area when the displacement means subsequently are lifted to their upper position.

BRIEF DESCRIPTION OF THE DRAWINGS

The invention will now be explained more closely with reference to the accompanying drawing, where:

FIGS. 2–4 show a cross-section through the apparatus of FIG. 1 for illustrating different steps of the method according to the invention.

Identical or corresponding elements in the Figures of the drawing will be provided the same designations. Therefore, no specific explanation will be given to each element in connection with each single Figure.

DETAILED DESCRIPTION OF PREFERRED EMBODIMENTS

Figure 1:
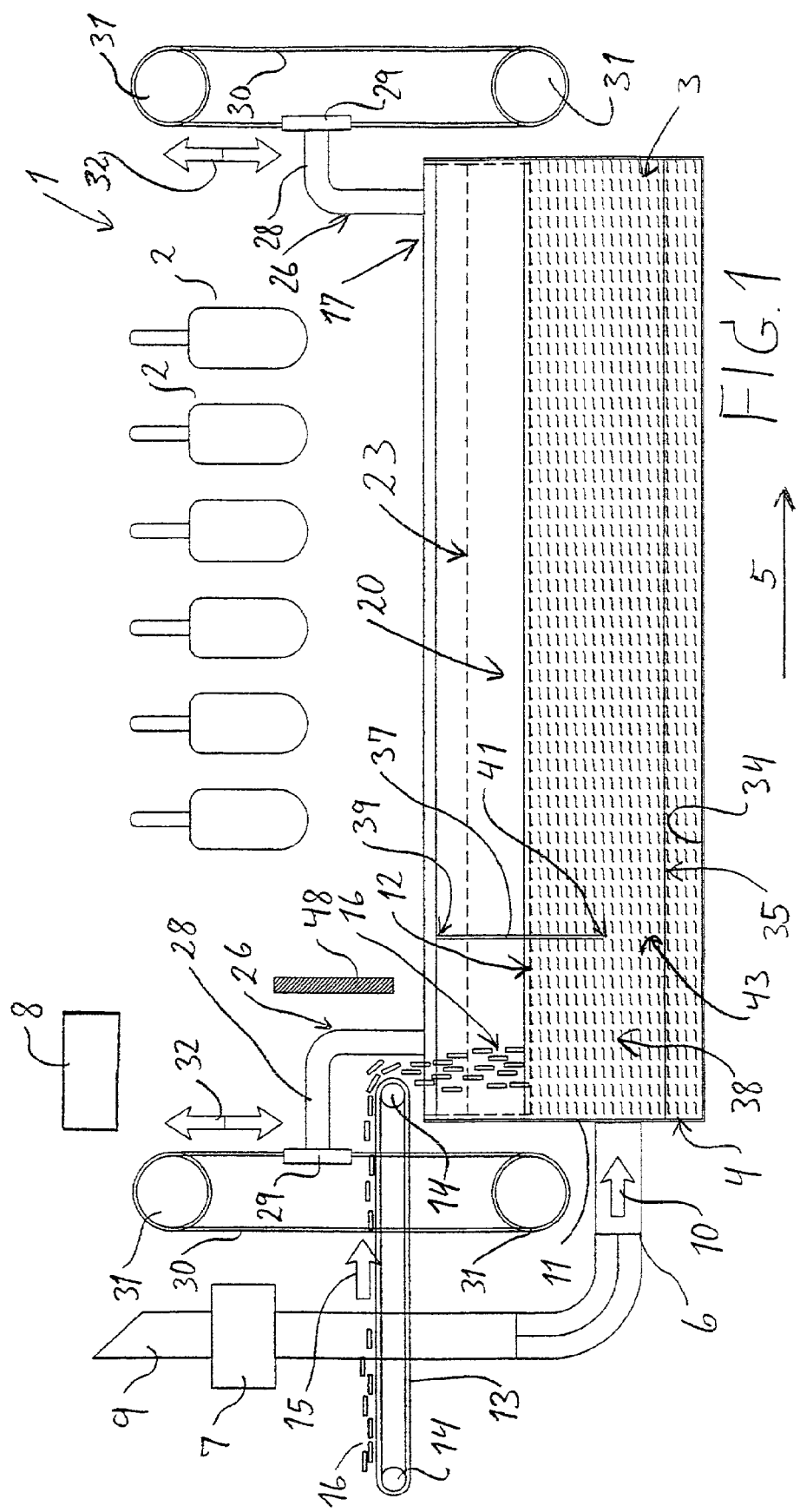
FIG. 1 shows a side view partly in section through an embodiment of an apparatus according to the invention.

FIGS. 1–4 of the drawing illustrates an apparatus according to the invention which is intended for use in coating products in the form of ice lollies 2 that are dipped in a coating mix 3 provided in a container 4. The container 4 is elongate in direction 5 so that a row of ice lollies 2 may be placed side by side above the container 4 and dipped into the coating mix 3.

The container 4 is connected with a pipeline 6 for supplying fluid chocolate mass. In the pipeline 6 there is provided a control valve 7 which may be opened and closed as a result of a signal from a control unit 8. A pipeline 9 at the other side of the valve 7 is connected with a raw material container (not shown) containing chocolate mass which is heated to a desired temperature. The fluid chocolate mass 10 is thus inserted via the pipeline 6 in an end side 11 of the container 4 at a level under the surface 12 of the coating mix 3. Hereby splash is avoided.

The apparatus 1 furthermore comprises a conveyor 13 in the shape of a conveyor belt running around reversing wheels 14. One of the reversing wheels are connected with a motor (not shown) which is also connected with the control unit 8 and which is started and stopped as a result of signals from the control unit 8. The conveyor belt 13 is driven in the direction of the arrow 15. Hereby almond flakes 16 coming from a storage container (not shown), which is located at the left side of FIG. 1 at a position besides the container 4, and a conveyor (not shown) used for advancing the ice lollies 2. The almond flakes 16 are conveyed over the reversing wheel 14 which is situated above the container 3 so that the almond flakes 16 are sprinkled down on the surface 12. Alternatively, the conveyor may be a vibration conveyor or an inclining funnel which are known within the art.

The apparatus 1 comprises displacement means 17 arranged to be lifted and lowered in first areas 18 of the coating mix (see FIGS. 2–4). The first areas 18 are provided along side edges 19 on the elongate container and disposed at each side of a central second area 20 which is the area where the ice lollies 2 are lowered into the coating mix 3.

Between the elongate first area 18 and the central second area 20, there are provided first level plates 21. These are provided adjustable in height as they are placed on vertical guides (not shown). In the embodiment shown there is provided second level plates 22 which are disposed within the first level plates 21 and which are also adjustable in height. The distance between the second level plates 22 is significantly less in order to provide a well-defined upper surface level 23 therebetween. The distance between the second level plates 22 will only be a little greater than the width 24 of an ice lolly which is lowered. By using the level plates there is achieved a well-defined surface level 23 defining the height of the coating to be established on the ice lolly 2. The way in which the surface level 23 is established will be explained later under the explanation of the mode of operation of the apparatus.

The displacement means 17 comprise elongate displacement means 25 that largely fills out the area of an associated first area 18. At each end, the displacement means 25 are connected with a bracket 26 extending up through the upper opening 27 of the vessel and which comprises an outward projecting part 28 ending in a mounting plate 29. The mounting plate 29 is connected with an endless belt 30, preferably toothed belt, running about two reversing wheels 31 which are connected with drive means enabling reciprocating movement of the belts 30. Hereby is established an up- and down-ward movement 32 of the bracket 26 and thereby the displacement means 25. The driving device comprising the endless belts and the reversing wheels 31 are suitably disposed at each side of the container 4 so that free passage for the ice lollies 2 is possible in direction across the vessel in direction as indicated with arrow 33. It is possible to used cylinders to provide the up- and downward movement 32 instead of the belts 30.

As mentioned above, the first level plates 21 are provided in the area between the first areas 18 and the central second area 20. The level plates 21 do not extend completely to the bottom 34 of the container 4. Between the underside 35 of the level plates and the bottom 34 there is thus provided an interspace 36 providing flow ducts for the passage of the coating mix from the first areas 18 to the second area 20. The central part of the container 4 is furthermore provided with a dividing plate 37. The dividing plate 37 delimits the second area 20 from a third area 38 where fluid chocolate mass 10 and almond flakes 16 are introduced to the container 4. The dividing plate 37 extends from a position 39 above an upper surface level 23 to a position 41 under a lowermost level 42 for the surface 12 of the coating mix. Between the lower edge 41 and the bottom 34 of the container 4, there is thus provided a flow duct 43 for passage of the coating mix between the third area 38 and the second area 20. Each of the displacement bodies 25 have an upper side 44 inclining down toward the central area 20. By an upper position of the displacement bodies 25 (shown in FIG. 2), the lower side edge 45 will be at level with or above an upper side edge 46 of the first dividing plates 21. Hereby, possible coating mix 47 (see FIG. 4) situated at the upper side of the displacement bodies 25 will run back into the central second area 20.

The apparatus comprises a height registering means 48 (see FIG. 1). This is provided in the form of a distance measuring sensor which measures the distance to the surface 12 in the coating mix in the third area 38 where the surface level is identical to the surface level in the second area 20. The sensor 48 is connected with the control unit 8 for transmitting a signal to the latter which is used for activating the valve 7 and the motors for the conveyor belt 16 for supplying fluid chocolate mass and almond flakes concurrently with consumption occurring when the coating mass 3 is drawn up with the ice lollies 2. Alternatively mechanical sensors may be used comprising a float on the surface of the coating mix in the second or third area 20. 38.

The apparatus 1 is used in a method according to the invention for coating the ice lollies 2 with the fluid chocolate mass containing the almond flakes 16. This occurs by dipping the ice lollies 2 in the coating mix 3 simultaneously with stirring the coating mix for avoiding sedimentation of the almond flakes 16. The stirring is established by lifting and lowering the displacement means 25 while the endless belts 30 are moved back and forth. The displacement bodies 25 are thus lifted and lowered in the elongate first areas 18.

Hereby the coating mass is brought through the flow connections 36 and 43 under the level plates 21 and the dividing plate 37.

By the reciprocating movement there is performed such a stirring that the almond flakes 16 are mixed with the fluid chocolate mass in the third area 38. Due to the dividing plate 37, almond flakes cannot flow on the surface 12 of the mixture into the second area 20.

Homogenisation of the mixture occurs by pressing/sucking it out into the first and second areas by the movement of the displacement bodies. When the displacement bodies are in their upper position as illustrated in FIG. 2, the lowermost level 42 for the coating mix 3 is provided in the second area 20. A row of ice lollies 2 is brought into position over area 20.

In the subsequent step illustrated in FIG. 3, lowering of the displacement bodies 25 is initiated. Hereby, the level of the coating mix rises in the second area. In FIG. 4 is illustrated a situation where the displacement bodies 25 are lowered to their lowermost position in the coating mix 3. There is established such a filling of coating mix 3 that the coating will reach the upper side of the first level plates 21 and the second level plates 22. Thus a well-defined upper surface level 23 is provided. In this step the row of ice jollies 2 are lowered into the second area 20. The lowering occurs with a well-defined height which preferably will be intended by a slat conveyor or similar transport means used for advancing the ice lollies 2. A well-defined height of the coating applied to the ice lollies 2 is thus established.

Then the row of ice lollies 2 is drawn up again from the coating mix 3 simultaneously with the displacement bodies 25 being lifted to their upper position illustrated in FIG. 2.

At a well-defined time in the cycle, the sensor 48 is activated again and measures the distance to the surface 12. If the surface reaches a lower limit, the container is replenished as the sensor transmits a signal to the control unit 8 activating the valve 7 and the drive means for the conveyor 13.

Figure 5:
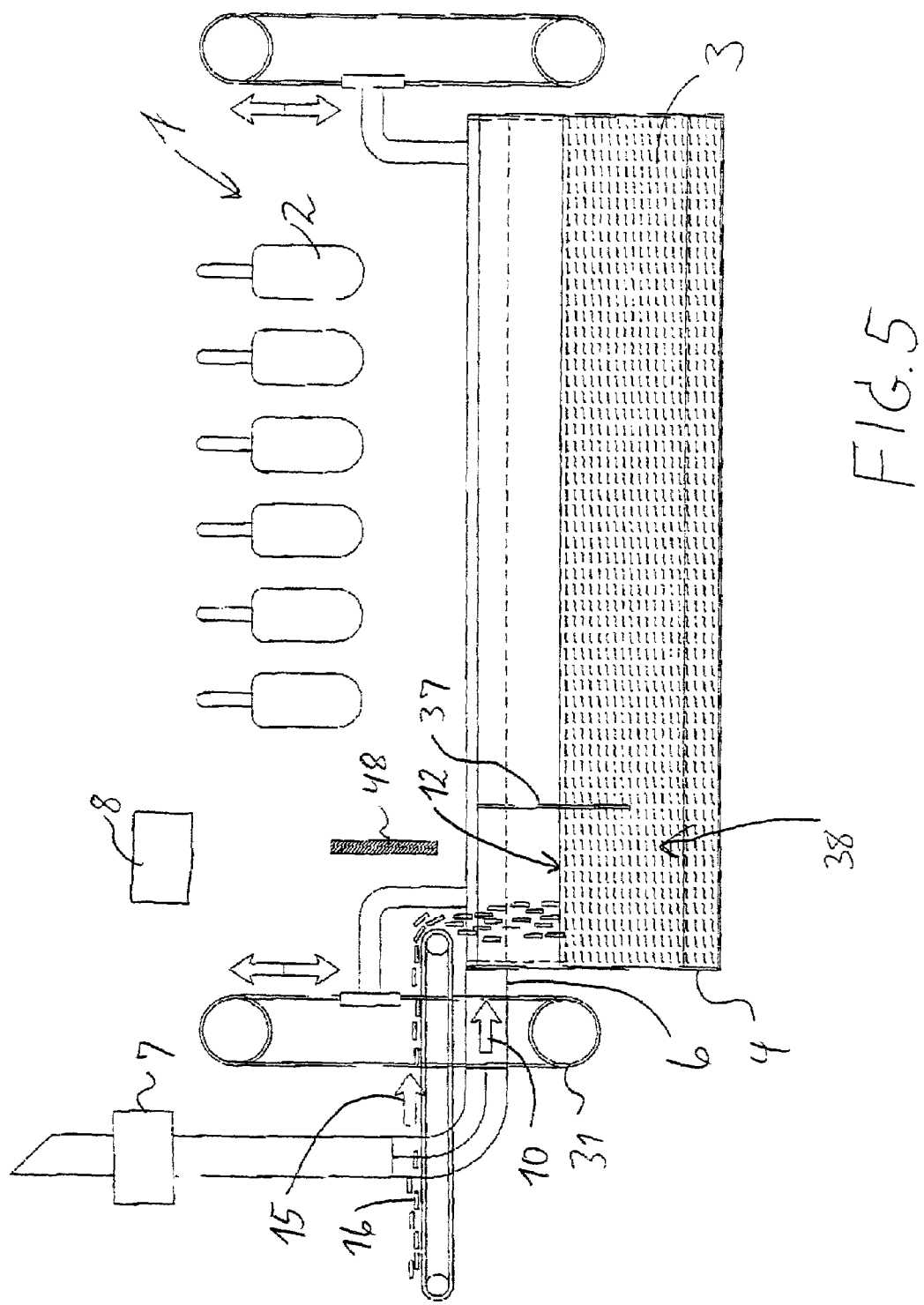
FIG. 5 shows a view corresponding to FIG. 1 for illustrating a second embodiment of an apparatus according to the invention.

The apparatus shown in FIG. 5 differs from the embodiment shown in FIG. 1 by the position of the pipeline 6 for the supply of fluid chocolate mass. In FIG. 5, the pipeline 6 is disposed for discharging into the third part 38 of the container at a level above the surface 12 of the coating mix 3. Even though this may imply risk of splashing, this has appeared advantageous in practice in connection with certain chocolate mixtures. Hereby is avoided the risk of entrainment of air. It is undesirable to entrain air in the coating mixture as air bubbles herein may cause insufficiently covering coating on the ice lolly.

Figure 6:
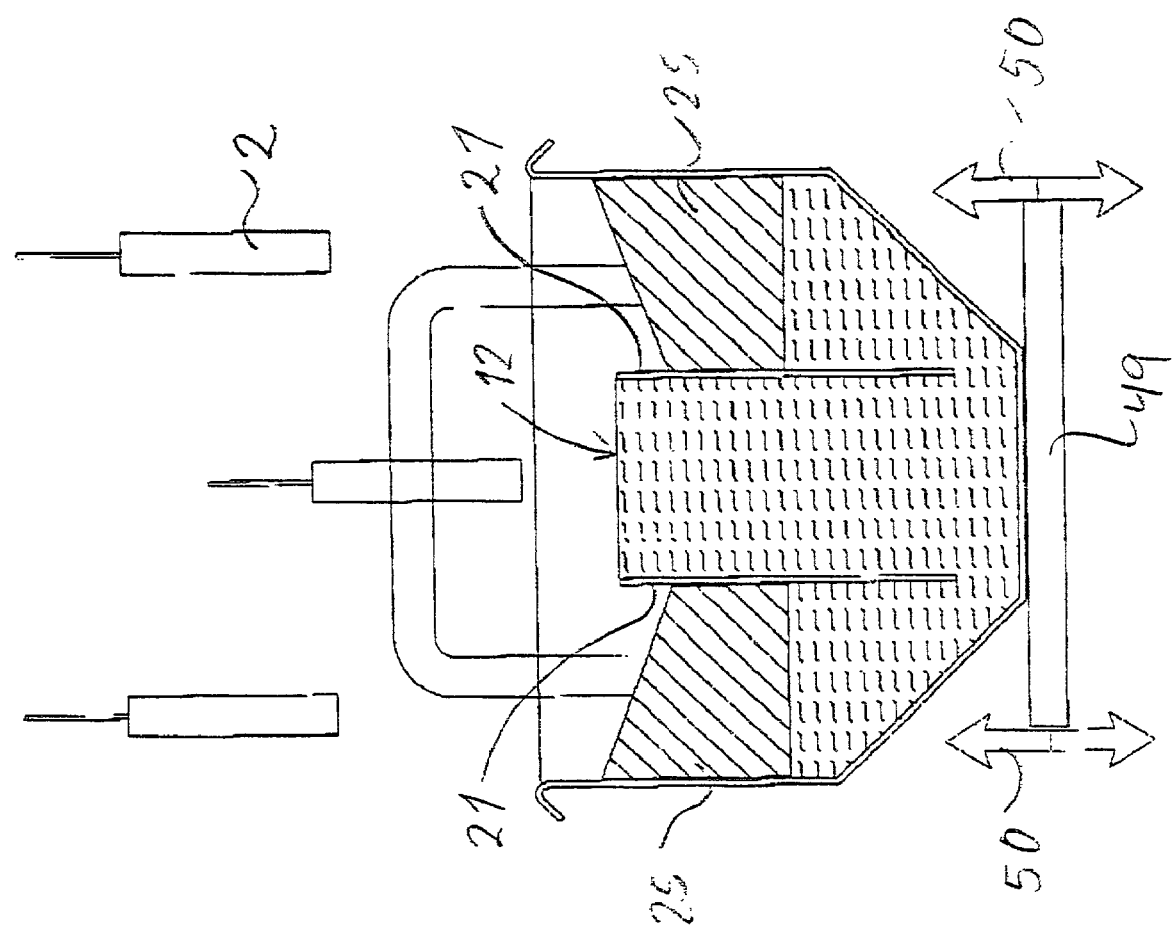
FIG. 6 shows a section corresponding to FIG. 3 for illustrating a further embodiment of the apparatus according to the invention.

The embodiment of the apparatus shown in FIG. 6 differs from the embodiment shown in FIGS. 1–4 by the other level plates 22 being omitted. Instead is used a device 49 that may lift and lower the whole container 4. The device 49 may thus provide an up- and downward going movement 50 of the container 4. The device 49 may thus be arranged with a spindle/thread connection with a cylinder or other device that may establish the up- and downward going movement with the purposed of fine adjustment of the upper well-defined surface level 23 for the surface 12 of the coating mix.

By using the device 49, cleaning of the apparatus becomes easier as there are fewer parts in the container 4 where coating mass may hang on. If the fine adjustment is provided by means of the device 49, the first level plates 21 may be provided in a fixed position. Hereby is achieved a particularly simple and very cleaning friendly structure as the container 4 do not have to be provided with adjusting means, guide and the like inside.

In the above, the invention has been explained with reference to specific embodiments and a specific application. However, it will appear that the apparatus may designed it other ways as well as the method may be used in connection with other products than ice lollies 2 as set out in the present specification and as defined in the claims. By the lifting and lowering of the displacement bodies in the mass 3, a careful handling occurs which does not cause crushing of the almond flakes. Furthermore, the flows established through the flow ducts will establish enough movement in the coating mix for avoiding sedimentation of the almond flakes 16 or other fragile additives. Instead of almond flakes, nut pieces and raisins or other additives may also be used.

What is claimed is:

1. A method for coating a product with a fluid coating containing solid fragile additives as the product is dipped in a coating mix which is stirred for preventing sedimentation of the additives, wherein the stirring is established as displacing bodies are lifted and lowered in one or more first areas of the coating mix, and that the products are lowered into a second area of the coating mix as the level of the surface of the coating is kept stationary during the lowering.

2. A method according to claim 1, wherein the products are lowered at a time where the displacement bodies are completely lowered in the coating mix, and where the level of the surface of the coating mix is kept stationary at an upper level.

3. A method according to claim 2, wherein the stationary level is defined by height adjustable level plates that are placed in the second area.

4. A method according to claim 1, wherein the consumption of coating mix is determined, and wherein replenishment of coating and additives is performed in an adjusted proportion in consequence of this determination as the additives and fluid coating are inserted in a third area of the coating mix.

5. A method according to claim 4, wherein fluid coating is inserted by pumping, and wherein the additives are sprinkled down on the surface in the third area.

6. A method according to claim 1, wherein the products are constituted by ice lollies, and wherein the coating is constituted by a chocolate mass containing nut pieces.

7. A method according to claim 6, wherein the nut pieces are elongate almond flakes.

* * * * *